Aug. 15, 1967 R. L. SMIRL 3,335,595
COVER PLATE FOR FRICTION DEVICE
Filed Dec. 30, 1964 3 Sheets-Sheet 2

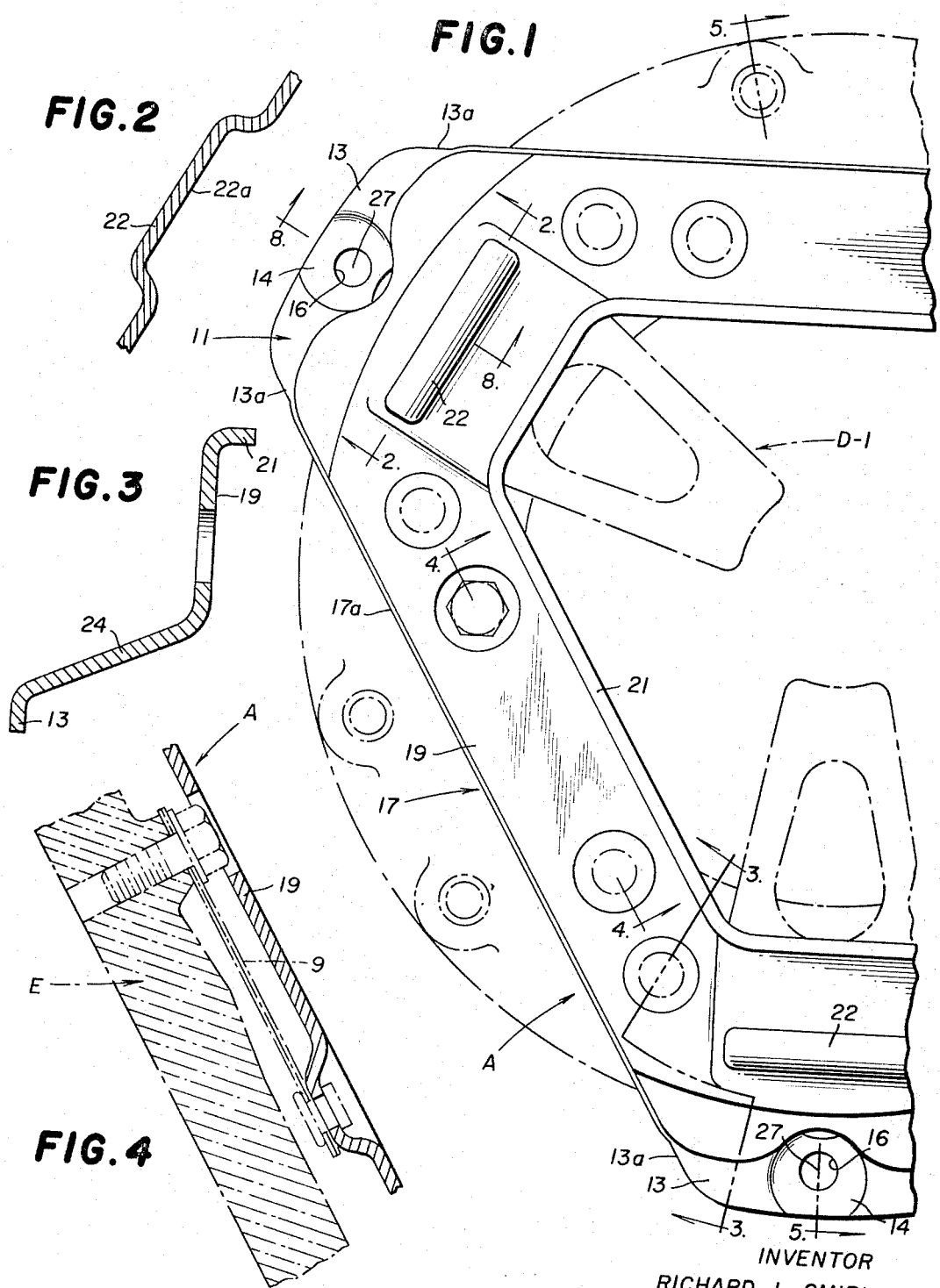

INVENTOR
RICHARD L. SMIRL
BY
Joseph W. Mallec
ATTY

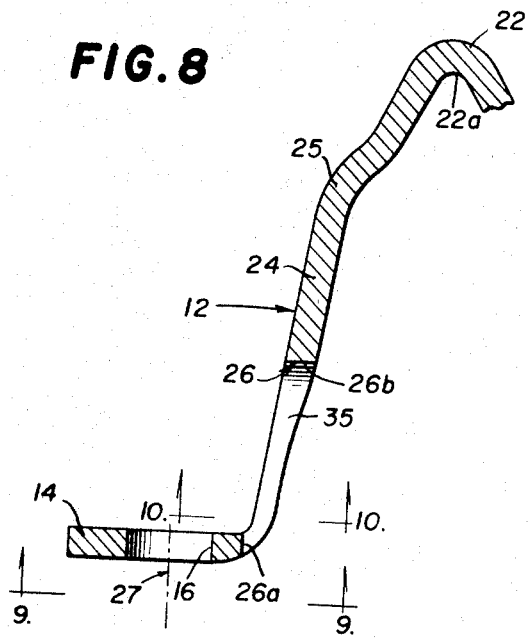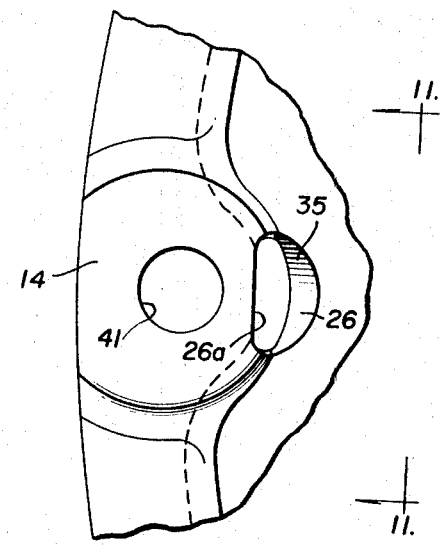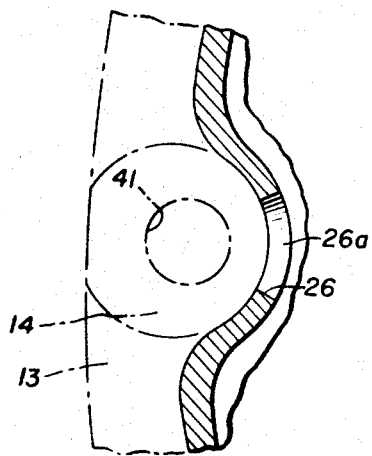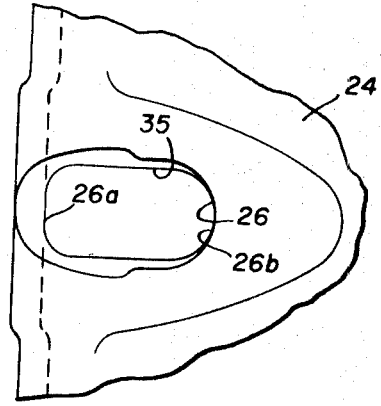

United States Patent Office 3,335,595
Patented Aug. 15, 1967

3,335,595
COVER PLATE FOR FRICTION DEVICE
Richard L. Smirl, La Grange Park, Ill., assignor to Borg-Warner Corporation, Chicago, Ill., a corporation of Illinois
Filed Dec. 30, 1964, Ser. No. 422,107
3 Claims. (Cl. 72—324)

ABSTRACT OF THE DISCLOSURE

A process for forming a sheet metal cover plate for a clutch device, the process comprising: a first step where a flat blank is defined from stock sheet metal having a plurality of generally trapezoidal areas with webs extending on a bias between these areas—each area has an oval-shaped opening with the greater axis thereof transverse to a radius extending from the center of the blank and the lesser axis of the oval bisecting the area; and a second step where the blank of sheet metal is stamped into a three-dimensional contour having three mounting stations lying in a common plane defined from the areas; the webs are offset from the mounting stations in a manner so that a fold occurs across each oval opening stretching them into more than one plane providing an access for the heads of mounting bolts positioned on each of the mounting stations.

---

This invention relates to an automotive type friction clutch and more particularly to the product and process of manufacturing a stamped sheet metal cover plate for clutches of the disc type.

A primary object of this invention is to provide a process for manufacturing a sheet metal cover plate for a disc type automotive clutch which substantially eliminates the number of manufacturing steps required to provide a finished cover plate with the necessary configuration and appropriate surfaces; the manufacturing method envisioned by this invention comprises a maximum of two steps wherein a flat sheet metal piece is blanked and then subsequently shaped into a three-dimensional cover plate by a single stamping operation resulting in the completed product.

Another object of this invention is to provide a novel method and product for a clutch cover plate which enables the resulting cover plate to have mounting stations closely positioned to the outer periphery of the friction elements enclosed therein without sacrificing strength for withstanding reaction loads.

Yet another object of this invention is to provide a unique cover plate and method of manufacturing which results in a product having mounting stations equally circumferentially spaced and interconnected by chordally disposed webs, the mounting stations being substantially comprised of conical sections integrated with each other by sharp radii, the cover plate being of a type to accommodate a rockable strut connection with a clutch actuating assembly (there being no positive connection between the cover plate and the lever actuating system).

Other objects and advantages of this invention will become more apparent from the following detailed description taken in connection with the accompanying drawings in which:

FIGURE 1 is a plan view, partially broken away, of a cover plate representing the product and manufactured by the process embodying the principles of this invention; other elements with which the cover plate cooperates are shown in phantom outline;

FIGURE 2 is a fragmentary sectional view taken substantially along line 2—2 of FIGURE 1;

FIGURE 3 is a sectional view taken substantially along line 3—3 of FIGURE 3;

FIGURE 4 is an enlarged fragmentary sectional view of a mounting portion of the cover plate shown in FIGURE 1 (taken substantially along line 4—4);

FIGURE 8 is a sectional view taken substantially along line 8—8 of FIGURE 1;

FIGURE 9 is a section view taken substantially along line 9—9 of FIGURE 8;

FIGURE 10 is a section view taken substantially along line 10—10 of FIGURE 8; and FIGURE 11 is a view taken along line 11—11 of FIGURE 9.

Figure 5:
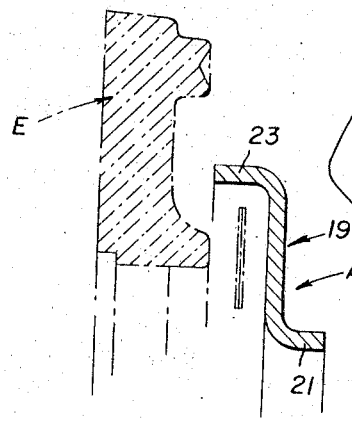
FIGURE 5 is a fragmentary view taken substantially along line 5—5 of FIGURE 4.

Turning now to the drawings and more particularly to FIGURES 1–5, a sheet metal cover plate A is illustrated as drivingly coupled with an annular flywheel B, the flywheel and cover plate constituting rotative input means for the clutch device, the latter assembly broadly designated 10. Rotative driven means C comprises a frictional disc C–1 drivingly splined to an output shaft C–2. An actuating assembly D comprises a plurality of radially disposed levers D–1 fulcrumed on the annular pressure plate E, the levers applying a working force to the pressure plate as received from a thrust bearing D–4 and reacting against the cover plate by way of a plurality of struts D–2. The actuating assembly is effective to urge the pressure plate (strapped to the cover plate by means 9) toward the flywheel and thereby clamp the rotative driven means C therebetween and provide for conjoint rotation.

Apart from the cover plate A, the above elements are considered typical in the art and will not be further described.

Turning now to the cover plate A, the resulting product configuration will be described, followed by description of the process of manufacturing. The cover plate comprises a plurality of equi-spaced mounting portions or stations 11 having a stepped side wall 12, the stepped side wall having a radially outwardly extending lip 13 provided with pads 14 (segments of a circle) effective to receive the fasteners (such as cap screws 15) extending through openings 16 generally centered in the pads. The mounting stations 11, are interconnected by chordally disposed webs 17, each of the webs and the upper portion 18 of the mounting stations being integrated together to form a rear wall 19 of the cover plate which is spaced from the common plane within which said lips 13 are disposed. The side edges 13a of the lips are aligned with the outer contour 17a of webs 17, as illustrated in FIGURE 1.

The rear wall 19 comprised of the chordal webs and upper portions 18 of each step 12, is provided with an inner peripheral flange 21 extending rearwardly of the device as illustrated in FIGURES 3 and 5.

The mounting stations are provided with several specific contours each of which are important to the effective functioning of the cover plate in the clutch device. The upper portions 18 of the steps 12 have a chordal pocket 22 with an inwardly facing semi-cylindrical surface 22a. The surface 22a is effective to rockably receive one of edges of the struts D–2. The outer periphery of the webs 17 is provided with an inwardly facing flange 23 which integrates into the side wall 24 of the steps 12.

Both the upper portion 18 and the side wall 24 of the steps 12 are formed of conically shaped sections interconnected by sharp bends or radii 25, augmented by the indented pockets 22 and the inner peripheral flange 21 to add axial rigidity to the sheet metal mounting stations at those locations; this provides a more stabilized cover plate while at the same time maintaining the economy of sheet metal construction. Flat sections at the back wall and mounting stations is to be avoided since flexure is more likely under reaction loads applied against them.

In the side wall 24 of each step 12, an access opening 26 is provided with generally inwardly curved edge contours 26a and 26b so as to maintain the center 27 of the bolt openings 16 in each pad as close as possible to the outer periphery of the enclosed elements of the clutch device. The geometry of such positioning enables the reaction loads applied to the cover plate to be as close as possible to the points at which the plate is mounted to the flywheel while at the same time providing a rear wall positioned to receive reaction forces to move the pressure plate.

Figure 6:
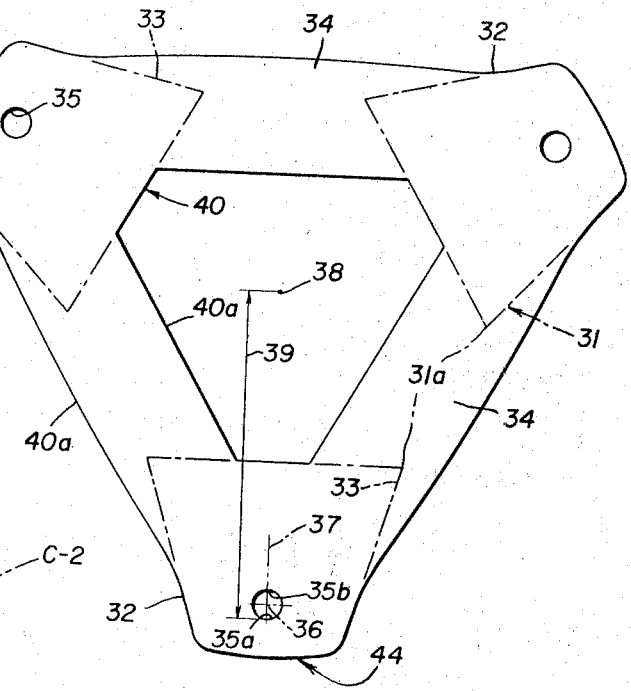
FIGURE 6 is a reduced illustration of the blank from which the cover plate is stamped in a single operation.
Figure 7:
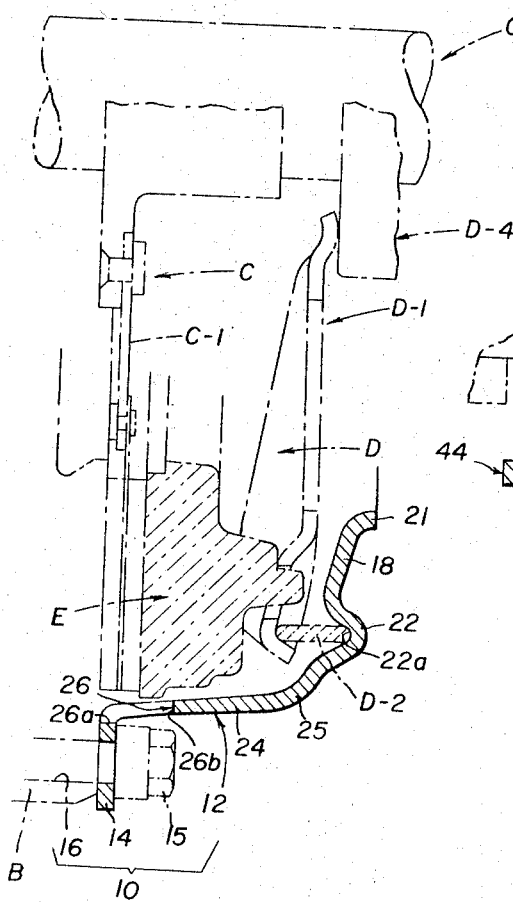
FIGURE 7 is a fragmentary elevational view of FIGURE 6.

The process of forming the resulting cover plate above described, in a simplified two step sequence, requires particular definition of a flat blank from which the cover plate may be stamped into three-dimensional contour by a single stroke. As shown in FIGURE 6, the first step of the process comprises blanking of a flat piece 30 having a plurality of generally trapezoidal areas 31, opposite sides 32 and 33 of the areas 31 slightly converging as they approach the end 44 thereof. Webs 34 extend on a bias between the areas 31 and interconnect the inner adjacent corners 31a of said trapezoidal areas. Each area 31 has a pear shaped opening 35 with a greater axis 36 transverse to a radius from center 38; the axis 37 of the opening bisects the area 31 and has an edge 35a positioned outwardly from the center 38 of the blank a distance 39 sufficient so that on three-dimensional forming of the blank, the inner edge 26a of the pads 14 will be at a predetermined distance from the center of the device. Positioning of edge 35a from the inner periphery 40 of the blank is generally equal to the composite dimension, taken on the resulting product, comprised of the width of the upper portion 18 of steps 12 and the extent of side wall 24.

Each of the webs 34 are provided with a generally straight inner edge 40a and a slightly bowed outer edge 44a which tends to narrow at the intersection of the webs with the trapezoidal areas 31. This is effective to accommodate folding of the areas 31 into the stepped mounting stations 12 whereby some of the metal material will be forced toward the web and thereby provide the resulting alignment of the resulting edge 13a with flange 23 in the three-dimensional cover plate.

During the stamping operation, circular openings 16 are simultaneously provided with centers 27 thereof aligned with the axis 37 of openings 35; the openings 16 are spaced outwardly of edge 26a a distance less than the distance the opening 16 is spaced from the outer edge 44 of the lips 13.

From the above characterized blank, the three-dimensional cover plate may be obtained by a single stamping stroke. During such steps, the outer portions of sides 32 and 33 of the blank will become edges 13a which are in alignment with the inwardly directed chordal flanges 23 and the webs will have a resulting straight periphery 17a. The openings 35 will be stretched into a different plane and configuration so that edge 35a and edge 35b will be generally lapped one above each other to provide an access for the more closely positioned cap screws 15 extending through openings 16. The pockets 22 and conical sections 18 and 24 will be formed adding inherent axial rigidity.

While I have described my invention in connection with one specific embodiment and other alternative suggestions thereof, it is understood that this is by way of illustration and not by way of limitation and the scope of my invention is defined solely by the appended claims which should be construed as broadly as the prior art will permit.

I claim:

1. A process for manufacturing a clutch cover plate, the steps comprising: blanking a sheet of metal while in flat condition to form a configuration provided with a plurality of trapezoidal areas equally circumferentially spaced about the center of said blank with opposite sides of each of said areas extending radially outwardly tending to converge, a plurality of elongated webs interconnecting the innermost corners of said areas and having radially outermost edge slightly bowed with the intermediate portion of each web being greatest in dimension, and pear-shaped access openings in each of said areas arranged with the major axis of the access openings being transverse to a radius of said blank and having a minor axis effective to bisect said areas; and stamping said blank into a three-dimensional form with said trapezoidal areas each provided with a stepped contour, the bottom of the step forming a bolt pad including bolt openings, the uppermost portion of said step integrating with said elongated web to constitute a rear wall of said cover plate, and the intermediate portion of said step formed with the pre-blanked outermost edge of said pear-shaped openings being lapped under the innermost edge of said openings.

2. The process as in claim 1, in which said stamping step further comprises definition of said stepped portion whereby a strut pocket is formed in the upper wall thereof having a section of a cylindrical surface facing inwardly, and said stepped portion having the upper walls formed of slightly conical section.

3. The process as in claim 1, in which said webs are defined by said stamping step with flanges provided along the radially innermost and radially outermost edges, the flanges of said webs being aligned with the sides of said stepped portions.

References Cited
UNITED STATES PATENTS

| 820,976 | 5/1906 | Katzinger | 72—379 |
| 2,332,175 | 10/1943 | Sinclair | 72—404 |
| 3,285,050 | 11/1966 | Cook | 72—234 |

CHARLES W. LANHAM, Primary Examiner.

L. A. LARSON, Assistant Examiner.